(12) United States Patent
Katakawa

(10) Patent No.: US 10,175,940 B2
(45) Date of Patent: Jan. 8, 2019

(54) MANAGING DEVICE, MANAGEMENT METHOD, RECORDING MEDIUM, AND PROGRAM

(71) Applicant: Rakuten, Inc., Shinagawa-ku, Tokyo (JP)

(72) Inventor: Jun Katakawa, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 614 days.

(21) Appl. No.: 14/766,177

(22) PCT Filed: Oct. 30, 2013

(86) PCT No.: PCT/JP2013/079446
§ 371 (c)(1),
(2) Date: Aug. 6, 2015

(87) PCT Pub. No.: WO2015/063895
PCT Pub. Date: May 7, 2015

(65) Prior Publication Data
US 2015/0370534 A1    Dec. 24, 2015

(51) Int. Cl.
| G06F 3/048 | (2013.01) |
| G06F 3/0481 | (2013.01) |
| G06F 3/0482 | (2013.01) |
| G06F 3/0484 | (2013.01) |
| G06F 3/16 | (2006.01) |
| G06F 9/48 | (2006.01) |

(Continued)

(52) U.S. Cl.
CPC .............. *G06F 3/167* (2013.01); *G06F 3/0482* (2013.01); *G06F 3/04847* (2013.01); *G06F 9/451* (2018.02); *G06F 9/485* (2013.01); *G06F 3/048* (2013.01); *G06F 3/0481* (2013.01); *H04M 1/72583* (2013.01)

(58) Field of Classification Search
CPC ...... G06F 3/048; G06F 3/0481; G06F 3/0482; G06F 3/04847; G06F 3/167; G06F 9/485; G06F 9/451; H04M 1/72583
See application file for complete search history.

(56) References Cited

U.S. PATENT DOCUMENTS

| 8,607,163 B2 * | 12/2013 | Plummer ............. G11B 27/105 715/825 |
| 2003/0163321 A1 * | 8/2003 | Mault .................... G16H 40/63 704/270 |

(Continued)

FOREIGN PATENT DOCUMENTS

JP    2013-137584 A    7/2013

Primary Examiner — Ting Z Lee
(74) Attorney, Agent, or Firm — Sughrue Mion, PLLC

(57) ABSTRACT

A managing device (10) includes: a display (11) that displays, as a selectable object, a process executable under a current state; an inputter (12) that accepts an inputting with voice; a selector (13) which compares the displayed process with the inputting accepted while the selectable object is being displayed, and which selects any one of the displayed processes; an executor (14) that executes the selected process; and a state changer (15) that changes the current state to a new state based on the current state and a result of the selected process upon completion of the selected process. When the selected process starts, the display (11) displays, as a pre-settable object, a process becoming executable in a state prospectively changed upon completion of the selected process.

24 Claims, 10 Drawing Sheets

(51) Int. Cl.
*H04M 1/725* (2006.01)
*G06F 9/451* (2018.01)

(56) References Cited

U.S. PATENT DOCUMENTS

| | | | |
|---|---|---|---|
| 2008/0181639 A1* | 7/2008 | Yokomizo | G03G 15/2064 399/68 |
| 2009/0097673 A1* | 4/2009 | Kitahara | G06F 3/0482 381/86 |
| 2010/0192092 A1* | 7/2010 | Brugler | G06F 3/0481 715/810 |
| 2012/0127527 A1* | 5/2012 | Nakabayashi | G06F 3/1204 358/1.15 |
| 2013/0138631 A1* | 5/2013 | Tomko | G06F 17/30864 707/722 |
| 2013/0166300 A1 | 6/2013 | Yokoyama et al. | |

* cited by examiner

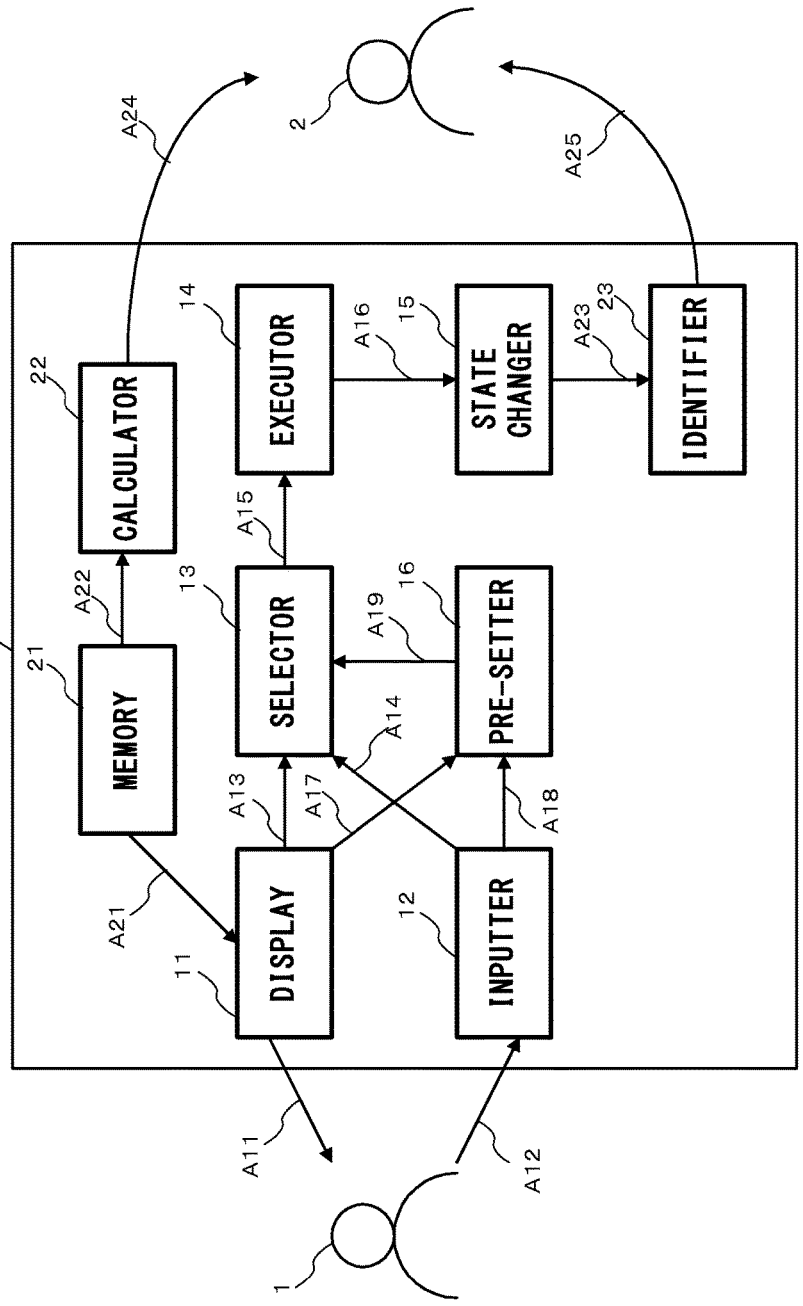

MANAGING DEVICE, MANAGEMENT METHOD, RECORDING MEDIUM, AND PROGRAM

CROSS REFERENCE TO RELATED APPLICATIONS

This application is a National Stage of International Application No. PCT/JP2013/079446 filed Oct. 30, 2013, the contents of all of which are incorporated herein by reference in their entirety.

TECHNICAL FIELD

The present disclosure relates to a managing device, a management method, a non-transitory recording medium, and a program.

BACKGROUND ART

Electronic devices which recognize a voice instruction from a user, and execute a process in accordance with such an instruction are known. For example, Patent Literature 1 discloses an electronic device which determines, in accordance with a sound input by a user, a target displayed on a screen, and an operation to be executed for this target, and executes the determined operation.

CITATION LIST

Patent Literature

Patent Literature 1: Unexamined Japanese Patent Application Kokai Publication No. 2013-137584

SUMMARY OF INVENTION

Technical Problem

Point-by-point voice instructions for a large number of processes result in a large burden to the user. Hence, electronic devices realizing a process in accordance with a voice instruction from the user as explained above often register tasks collectively covering a large number of processes in advance, and the user selects a task to be executed among the presented tasks.

The user sometimes desires to pre-set and register a task to be executed next while a task needing a time from the begging to the end is being executed. When a next task can be pre-set and registered without waiting for the completion of the currently executed task, the user becomes able to carry out another work upon pre-setting and registration, thereby improving the work efficiency.

The present disclosure has been made in view of the foregoing circumstances, and it is an objective to provide a managing device, a management method, a non-transitory recording medium, and a program which accept a pre-setting of a process to be executed next while executing a process in accordance with a sound input by a user.

Solution to Problem

To accomplish the above objective, a managing device according to a first aspect of the present disclosure includes: a display that displays, as a selectable object, a process executable under a current state; an inputter that accepts an inputting with voice; a selector which compares the displayed process with the inputting accepted while the selectable object is being displayed, and which selects any one of the displayed processes; an executor that executes the selected process; and a state changer that changes the current state to a new state based on the current state and a result of the selected process upon completion of the selected process, in which when the selected process starts, the display displays, as a pre-settable object, a process becoming executable in a state prospectively changed upon completion of the selected process.

The managing device of the first aspect may further include a pre-setter which compares the process displayed as the pre-settable object with an inputting accepted while the pre-settable object is being displayed, and which pre-sets any one of the processes displayed as the pre-settable objects, in which the selector may select the pre-set process when the displayed processes contain the pre-set process.

In the managing device of the first aspect, when the displayed processes contain the pre-set process, the display may display the pre-set process in a highlighted manner.

In the managing device of the first aspect, when the processes to be displayed contain a plurality of pre-set processes, the display may display and narrows down the processes to be displayed to the pre-set processes.

The managing device of the first aspect may further include a memory that stores, in association with each other, a process displayed as the selectable object or the pre-settable object, and a necessary time for the executor to execute that process, in which the display displays the necessary time to execute the process displayed as the selectable object while the selectable object is being displayed.

In the managing device of the first aspect, when the selected process starts, the display may display, as the pre-settable object, a process among the processes becoming executable under a state prospectively changed by the state changer upon completion of the selected process and in compliance with a predetermined criterion.

In the managing device of the first aspect, the state changer may change the state in accordance with a provided state transition diagram and an assigned process; and the managing device may further include a calculator that calculates a necessary time for the executor to execute a process associated with a state change when the state changer changes the state in accordance with the provided state transition diagram and the assigned process.

In the managing device of the first aspect, the state changer may change the state in accordance with a provided state transition diagram and an assigned process; and the managing device may further include an identifier that identifies, when the state changer changes the state in accordance with the provided state transition diagram and the assigned process and a number of changes from a given state to a predetermined state exceeds a threshold value, the given state.

To accomplish the above objective, a management method according to a second aspect of the present disclosure includes: a display step for displaying, as a selectable object, a process executable under a current state; an inputting step for accepting an inputting with voice; a selecting step for comparing the displayed process with the inputting accepted while the selectable object is being displayed, and of selecting any one of the displayed processes; an executing step for executing the selected process; and a changing step for changing the current state to a new state based on the current state and a result of the selected process upon completion of the selected process, in which in the display step, when the selected process starts, a process becoming executable in a state prospectively changed upon completion of the selected process as a pre-settable object.

To accomplish the above objective, a computer-readable non-transitory recording medium according to a third aspect of the present disclosure has stored therein a program that causes a computer to realize: a display function that displays, as a selectable object, a process executable under a current state; an inputting function that accepts an inputting with voice; a selecting function which compares the displayed process with the inputting accepted while the selectable object is being displayed, and which selects any one of the displayed processes; an executing function that executes the selected process; and a state-changing function that changes the current state to a new state based on the current state and a result of the selected process upon completion of the selected process, in which when the selected process starts, the display function displays, as a pre-settable object, a process becoming executable in a state prospectively changed upon completion of the selected process.

To accomplish the above objective, a program according to a fourth aspect of the present disclosure causes a computer to realize: a displaying function that displays, as a selectable object, a process executable under a current state; an inputting function that accepts an inputting with voice; a selecting function which compares the displayed process with the inputting accepted while the selectable object is being displayed, and which selects any one of the displayed processes; an executing function that executes the selected process; and a state-changing function that changes the current state to a new state based on the current state and a result of the selected process upon completion of the selected process, in which when the selected process starts, the display function displays, as a pre-settable object, a process becoming executable in a state prospectively changed upon completion of the selected process.

Advantageous Effects of Invention

According to the present disclosure, it becomes possible to provide a managing device, a management method, a non-transitory recording medium, and a program which improve work efficiency for a user.

BRIEF DESCRIPTION OF DRAWINGS

FIG. 10 is a block diagram illustrating a functional configuration of a managing device according to an embodiment of the present disclosure.

DESCRIPTION OF EMBODIMENTS

An explanation will be given of an embodiment of the present disclosure with reference to the accompanying drawings.

Embodiment

A managing device 10 according to an embodiment of the present disclosure has a function of executing a process in accordance with an instruction given by a user. The managing device 10 of this embodiment presents processes executable by the managing device 10 to the user, and executes the process selected by the user. In addition, the managing device 10 presents a task that is a collection of multiple processes to the user as a selective object, or can successively execute sequential processes contained in the selected task.

Figure 1:
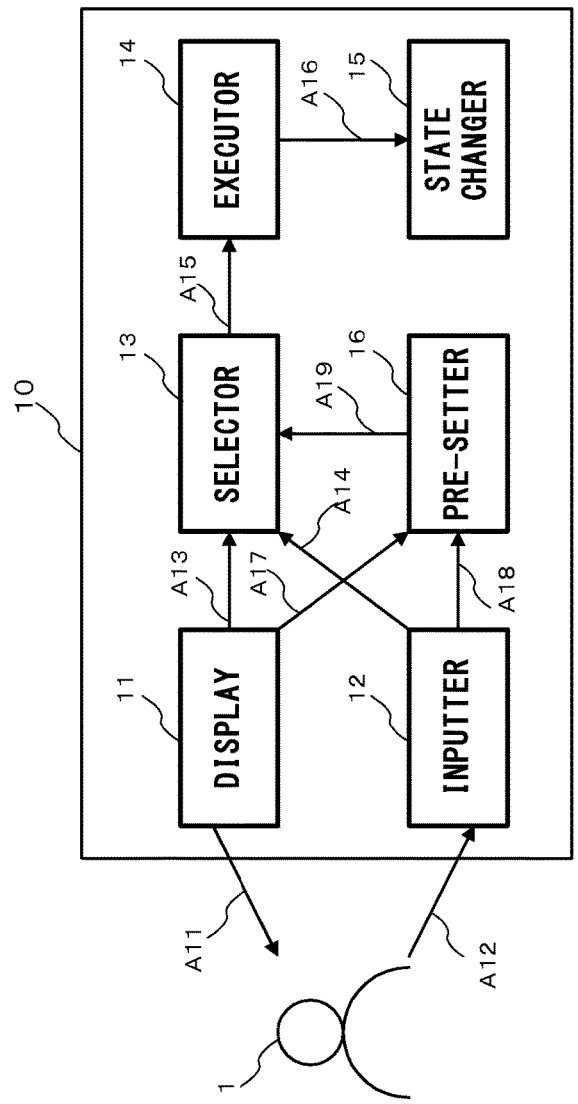
FIG. 1 is a block diagram illustrating a functional configuration of a managing device according to an embodiment of the present disclosure.

As illustrated in FIG. 1, the managing device 10 of this embodiment includes, as functional configurations, a display 11, an inputter 12, a selector 13, an executor 14, a state changer 15, and a pre-setter 16.

The display 11 displays (A11) executable processes (task) in a current state to a user 1 as a selective object.

The inputter 12 accepts a sound input. When the user 1 selects a task among the selective objects presented by the display 11, and reads (A12) the name of this task with voice, the inputter 12 detects and recognizes the voice.

The selector 13 compares the process displayed as the selective object with the input accepted while the selective object is displayed, and selects any of the displayed processes. When the selector 13 compares the task (A13) displayed by the display 11 with the contents (A14) of the voice recognized by the inputter 12, and the displayed tasks contains the process consistent with the name of task indicated by the voice, the selector selects such a task.

The executor 14 executes the selected process from the selective objects by the selector 13. The executor 14 executes, based on the hardware to be discussed later, the task (A15) selected by the selector 13.

The state changer 15 changes the state of the managing device 10 to a new state based on the current state and an execution result (A16) of the selected process (task) when the selected process (task) completes.

In addition, the above-explained display 11 displays (A11), as a pre-settable object, a process (task) becoming executable under a condition in which the state changer prospectively makes a transition when the selected process completes upon a start of the selected process (task). Hence, while the executor 14 is executing a process (after the executor 14 starts the process and before completes the process), the user 1 can display the process (task) to be executed by the executor 14 after the forgoing process completes. When the user 1 selects a task from the pre-settable objects indicated by the above-explained display 11, and reads (A12) the name of the task with voice, the above-explained inputter 12 detects and recognizes the voice.

The pre-setter 16 compares the process displayed as the pre-settable object with an input accepted while the pre-settable object is displayed, and pre-sets any of the processes displayed as the pre-settable objects. The pre-setter 16 compares the process (A17) displayed as the pre-settable object by the display 11 with the contents (A18) of the voice recognized by the inputter 12, and pre-sets (A19) the process when the displayed processes contains the process consistent with the name of process indicated by the voice.

Meanwhile, the pre-setter 16 is not an essential element in the managing device 10 of this embodiment, and can be omitted as needed.

When the state changer 15 changes the state of the managing device 10, and the display 11 displays an executable process under a current condition, if the displayed processes contain the pre-set process (A19), the above-explained selector 13 selects the pre-set process. Upon selection, the executor 14 executes the selected process (the process pre-set up to that time).

The managing device 10 employing the above-explained configuration is capable of, while executing a given process, accepting a pre-setting of a process becoming an executable after the given process completes, and sequentially executing the pre-set process when the given process completes. Hence, the managing device 10 can provide a further better operability to the user.

Figure 2:
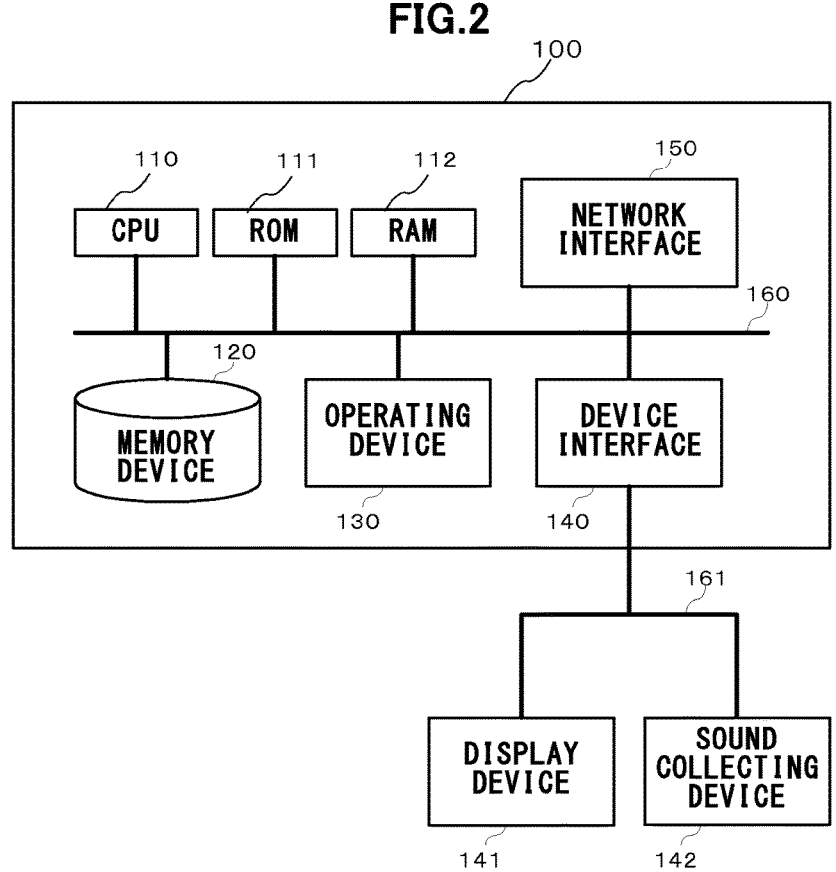
FIG. 2 is a block diagram illustrating a hardware configuration of the managing device.

The managing device 10 of this embodiment includes, as hardware, as illustrated in FIG. 2, an information device 100, and a display device 141 and a sound collecting device 142 connected to the information device 100.

As illustrated in FIG. 2, the information device 100 includes, as hardware, a CPU (Central Processing Unit) 110, a ROM (Read Only Memory) 111, a RAM (Random Access Memory) 112, a memory device 120, an operating device 130, a device interface 140, and a network interface 150, and those are connected one another via an internal bus 160 or a device connection 161.

The CPU 110 executes programs stored in the ROM 111, the RAM 112, and the memory device 120, thereby controlling the whole information device 100. The CPU 110 reads the program to be executed from the ROM 111, the RAM 112, and the memory device 120, as needed, and stores data on the RAM 112 and the memory device 120 as needed.

The CPU 110 functions as a component realizing the aforementioned respective functions (display 11, inputter 12, selector 13, executor 14, state changer 15, and pre-setter 16). The function will be explained in detail later.

The ROM 111 stores the program necessary for the operation of the CPU 110, for example, a program or the like initially executed by the CPU 110 upon activation of the information device 100.

The RAM 112 functions as a work area when the CPU 110 executes the program. That is, the RAM 112 records the program currently executed by the CPU 110 or temporal data necessary for the CPU 110 to execute the program, and provide such program or data to the CPU 110 in accordance with a request from the CPU 110.

The memory device 120 includes a memory device, such as a hard disk drive or a flash memory, and stores necessary data to operate the information device 100.

The memory device 120 records, for example, the program to be executed by the CPU 110, or data referred when the CPU 110 executes the program, and provides the program or the data to the CPU 110 in accordance with a request therefrom. In addition, the memory device 120 records data output by the CPU 110 in accordance with a request therefrom.

The operating device 130 includes a keyboard, a mouse, and the like, accepts an inputting operation by an operator, and transmits the accepted operation to the CPU 110. It is unnecessary for the information device 100 to be always provided with the operating device 130, and for example, if the operating device 130 is connected only when an inputting operation like setting of a task becomes necessary, it is unnecessary for the information device 100 to be provided with the operating device 130 except the aforementioned case.

The device interface 140 relays information exchange between the internal hardware of the information device 100 like the CPU 110, and the display device 141 and the sound collecting device 142 to be discussed later. When receiving information from the CPU 110 to the display device 141, the device interface 140 transmits such information to the display device 141. In addition, when receiving information from the sound collecting device 142 to the CPU 110, the device interface 140 transmits such information to the CPU 110.

The network interface 150 connects the information device 100 to a network (unillustrated). When the information device 100 transmits information to another device via the network or when the information device receives information from another device, the network interface 150 transmits information received from the CPU 110 through the internal bus 160 to be discussed later to another device via the network, or transmits information received from another device via the network to the controller 110 via the internal bus 160.

The network interface 150 may connect the information device 100 to the network via, for example, a cable, or may connect the information device 100 to the network through wireless communication.

The internal bus 160 relays information exchange between internal structural components (CPU 110, ROM 111, RAM 112, memory device 120, operating device 130, device interface 140, network interface 150, and the like) of the information device 100. When, for example, the CPU 110 reads necessary data from the memory device 120, the CPU 110 reads the data from the memory device 120 via the internal bus 160.

The display device 141 includes, for example, a liquid crystal display or a projector display, and displays information (for example, executable processes to be discussed later) output by the CPU 110 to the operator.

The sound collecting device 142 receives sound from the exterior, converts the received sound into electric signals, and transmits the electric signals to the CPU 110. For example, the sound collecting device 142 receives a voice instruction from the user indicating a process to be executed, converts the voice instruction into electric signals, and transmits the electric signals to the CPU 110.

The device connection 161 relays information exchange between the device interface 140 and the display device 141 or the sound collecting device 142. When, for example, the sound collecting device 142 receives sound from the exterior, the sound collecting device 142 transmits electric signals obtained upon conversion of the received sound to the device interface 140 via the device connection 161. The device interface 140 transmits the electric signals received from the sound collecting device 142 to the CPU 110 via the internal bus 160.

The device connection 161 may be a connection on the basis of a wired cable like the USB standard, or may be a wireless communication connection in compliance with a wireless communication standard like Bluetooth (registered trademark).

Figure 3:
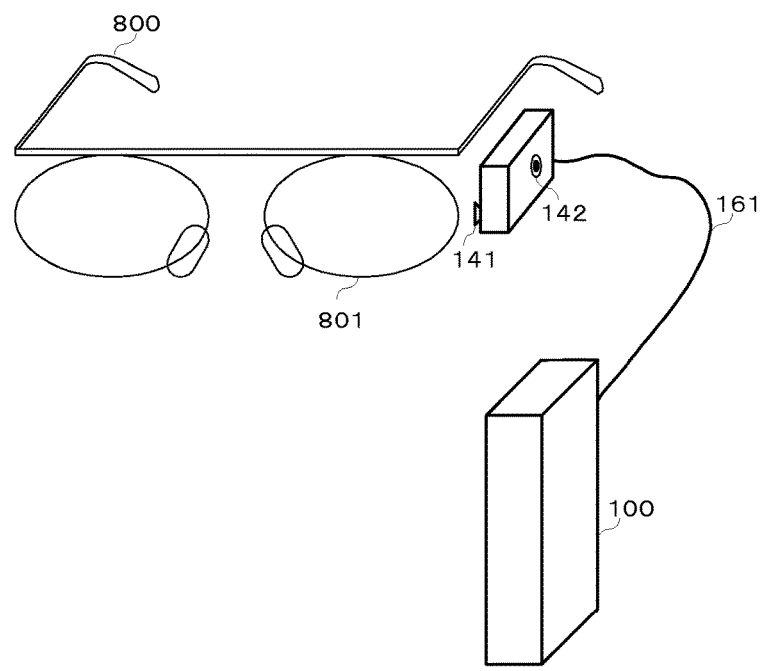
FIG. 3 is a diagram illustrating an example external appearance of the managing device.

As an example, as illustrated in FIG. 3, the managing device 10 of this embodiment may have the display device 141 and the sound collecting device 142 integrally attached to an eye-glass display device 800. According to this example case, the display device 141 emits light to a lens 801 of the eye-glass display device 800 to cause the managing device 10 to display information to the user. In addition, the user inputs an instruction with voice to the sound collecting device 142 to select a process to be executed among the displayed processes, or to update the displayed content.

The information device 100 transmits information to be displayed to the display device 141 via the device connection 161, or receives signals from the sound collecting device 142 via the device connection 161.

Figure 4:
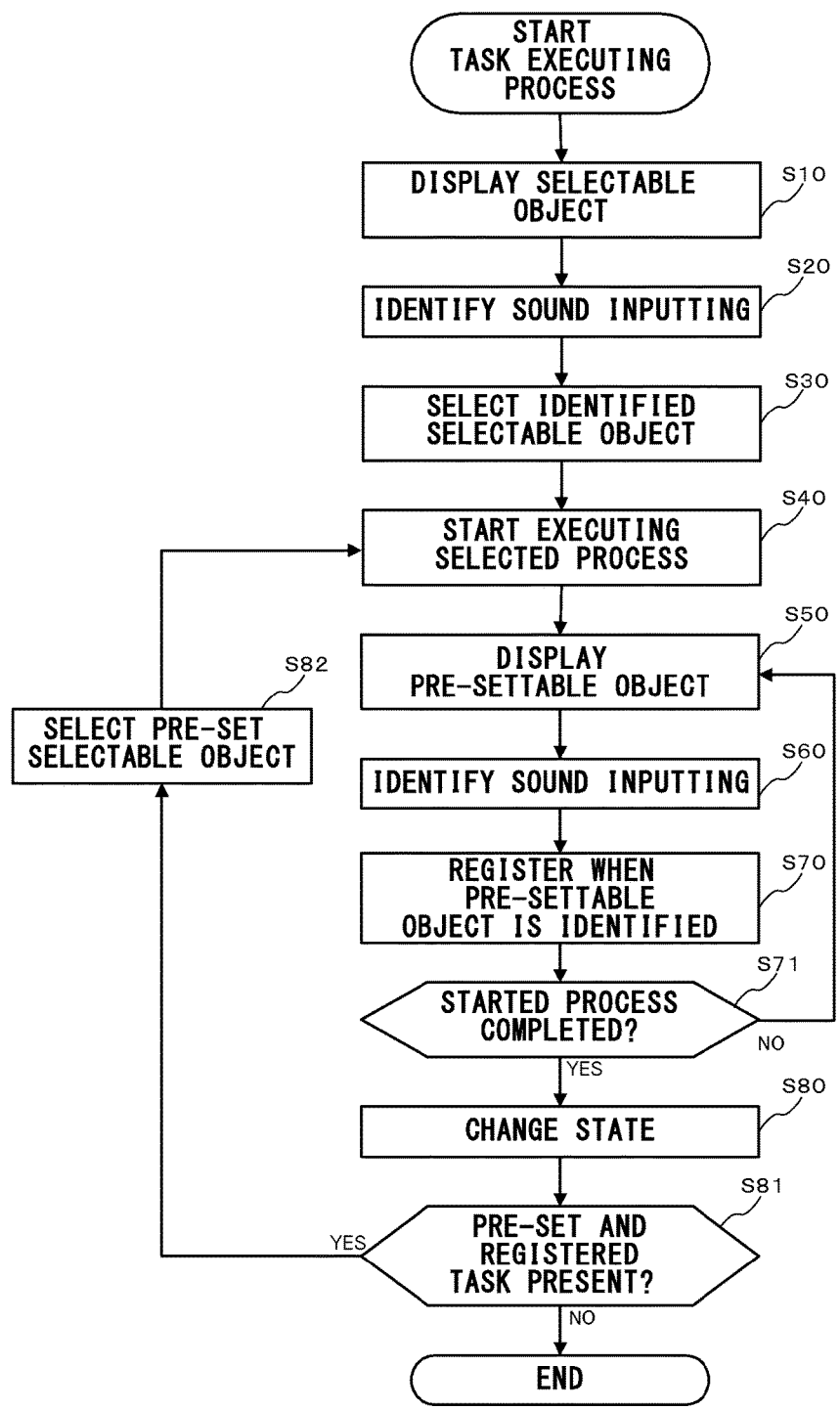
FIG. 4 is a flowchart illustrating a task executing process according to an embodiment of the present disclosure.

The managing device 10 of this embodiment executes a task executing process in accordance with the flowchart of FIG. 4. An explanation will now be given of the task executing process.

At the beginning of the task executing process, the CPU 110 displays (step S10), as selectable objects, processes (tasks) currently executable on the display device 141. Through this process, the CPU 110 functions as a display 11.

Next, the CPU 110 receives and recognizes (step S20) voice from the user through the sound collecting device 142. Through this process, the CPU 110 functions as the inputter 12.

Subsequently, the CPU 110 compares the process displayed in the step S10 with the selectable objects identified in the step S20, and selects any of the displayed processes (step S30). Through this process, the CPU 110 functions as the selector 13.

Next, the CPU 110 starts (step S40) executing the selected process in step S30. Upon execution of the selected process in the step S30, the CPU 110 functions as the executor 14.

When starting the process, the CPU 110 displays (step S50), as a pre-settable object, processes becoming executable upon completion of the currently executed process.

After displaying the pre-settable objects in the step S50, the CPU 110 receives and identifies (step S60) voice from the user through the sound collecting device 142.

After receiving and identifying the voice from the user in the step S60, the CPU 110 compares the process displayed in the step S50 with the pre-settable object identified in the step S60, and selects any of the displayed processes (step S70). Upon execution of the processes from the step S50 to the step S70, the CPU 110 functions as the pre-setter 16.

After the completion of the step S70, the CPU 110 determines (step S71) whether or not the process started in the step S40 has completed. When determining that the process has not completed yet (step S71: NO), the CPU 110 returns the process to the step S50, the pre-settable objects are displayed again, and the following processes are repeated.

When determining in the step S71 that the process started in the step S40 has completed (step S71: YES), the CPU 110 changes (step S80) the current state to a new state based on the current state and the result of the executed process. Through this process, the CPU 110 functions as the state changer 15.

After the completion of the step S80, the CPU 110 determines (step S81) whether or not there is a pre-set process. When determining that there is a pre-set process (step S81: YES), the CPU 110 selects (step S82) this pre-set process, returns the process to the step S40, and executes the selected process.

Conversely, when determining that there is no pre-set process (step S81: NO), the CPU 110 ends the task executing process.

In the task executing process explained above, the processes from the step S40 to the step S70 are successive processes, but the present disclosure is not limited to this case. For example, the information device 100 starts (step S40) executing the selected process, and displays (step S50) pre-settable objects, but when the process started without a voice instruction by the user is finished, the information device 100 may change (step S80) the state without executing the processes in the step S60 (identification of sound input), and the step S70 (registration of pre-settable object).

The managing device 10 of this embodiment has a function of displaying a currently accepted order in a store accepting an order through, for example, the Internet. For example, an employee picks up a product requested in an order from a warehouse while viewing the contents of the order displayed on the managing device 10, packages the product, and ships the product to the person who made an order. Since the employee can operate the managing device 10 without using a hand, for example, the employee can carry the product with both hands and package the product while simultaneously viewing the order on the information device 100.

The managing device 10 has a function of searching an order from a customer, and displays the search result as a list. For example, the managing device 10 searches, among orders made by customers and currently accepted, an order processed as an error, and displays such errors as a list. For example, in a credit authentication process performed based on credit card information entered by a customer at the time of ordering, when the credit information is denied by a credit card company, the managing device 10 determines such an order as an error. Alternatively, when there is an order having a paying-in process not yet completed even though a certain time period has passed after the order was made, the managing device 10 determines such an order as an error.

The managing device 10 can perform, for each order extracted through the searching process, a process according to such an order. When, for example, the order extracted through the searching process is an order having the credit denied by a credit company, the managing device 10 can perform again a credit authentication process in such an order. Alternatively, when the order displayed upon searching has a paying-in process not yet completed even though a certain time period has passed when the order was made, the managing device 10 may cancel this order.

In addition, the managing device 10 can pre-set and register the aforementioned processes while executing the searching process. When, for example, an order displayed at the uppermost portion of a list is the order having the credit denied by a credit card company, the user may pre-set and register the aforementioned credit authentication process, thereby causing the managing device 10 to execute the credit authentication process after the completion of the searching process. Likewise, when the order displayed at the uppermost portion of the list is the order having the paying-in process not yet completed although a certain time period has passed, the user may pre-set and register a process of canceling this order, thereby causing the managing device to cancel this order after the completion of the searching process.

Figure 5:
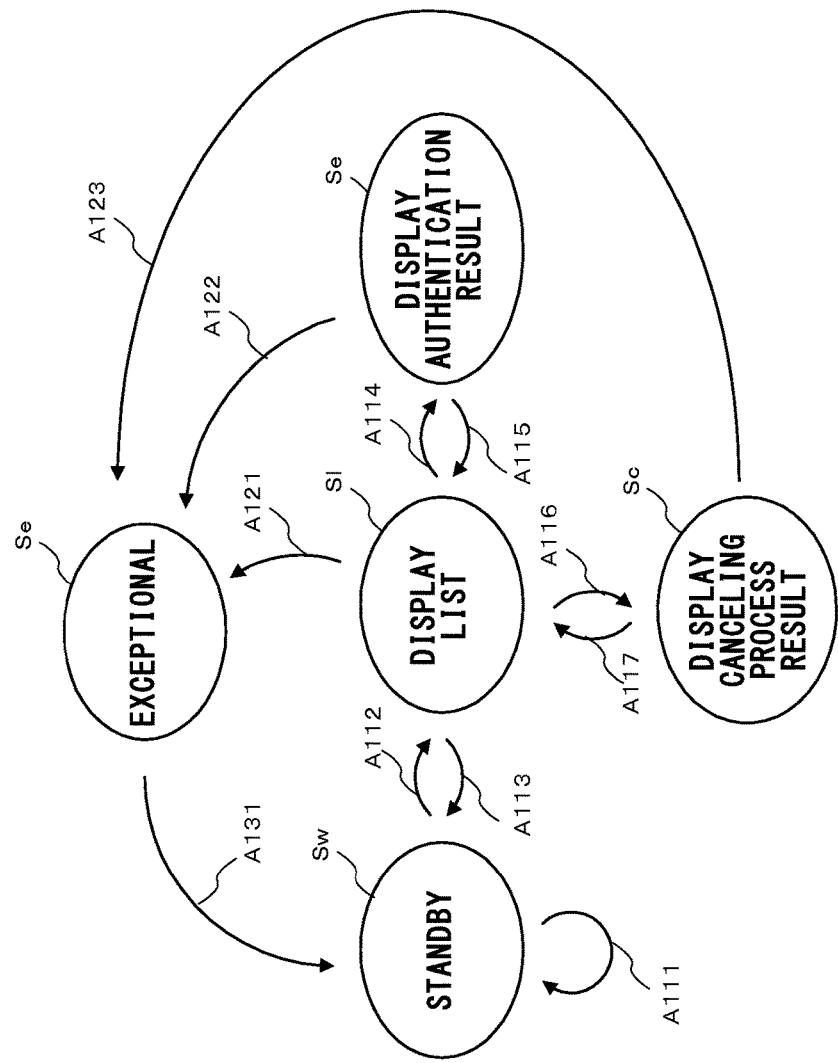
FIG. 5 is a diagram illustrating an example state transition diagram of the managing device.

The managing device 10 changes the state in accordance with a state transition diagram of FIG. 5. An explanation will now be given of an actual operation of the managing device 10 with reference to FIG. 5.

Figure 6:
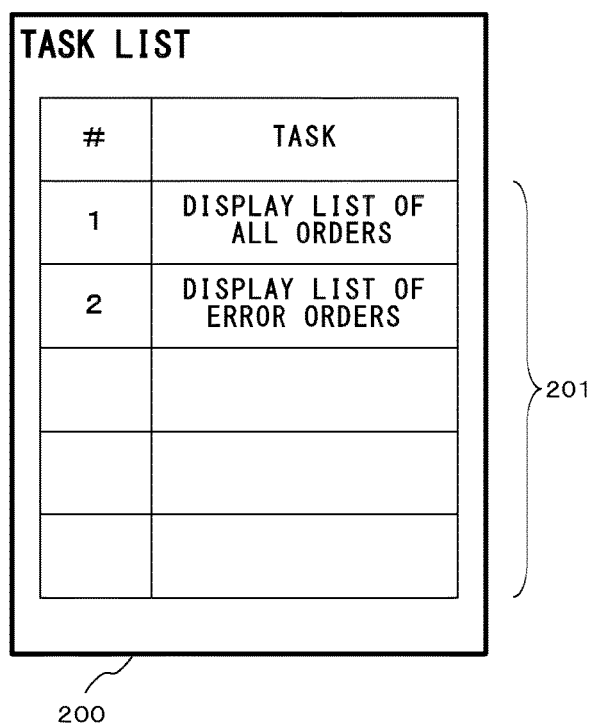
FIG. 6 is a diagram illustrating an example screen displayed on a display of the managing device.

In a standby state Sw, the managing device 10 displays executable processes, and waits for an instruction from the user. For example, as illustrated in FIG. 6, the managing device 10 displays, as selectable objects, executable processes in a task display field 201 on a task list display screen 200.

When the managing device 10 is in the standby state Sw, upon reception of an instruction from the user of searching errors processed as errors, the managing device 10 starts the searching process. Upon execution of the search process, when there is no order processed as an error, the managing device 10 maintains the standby state Sw (A111).

Figure 7:
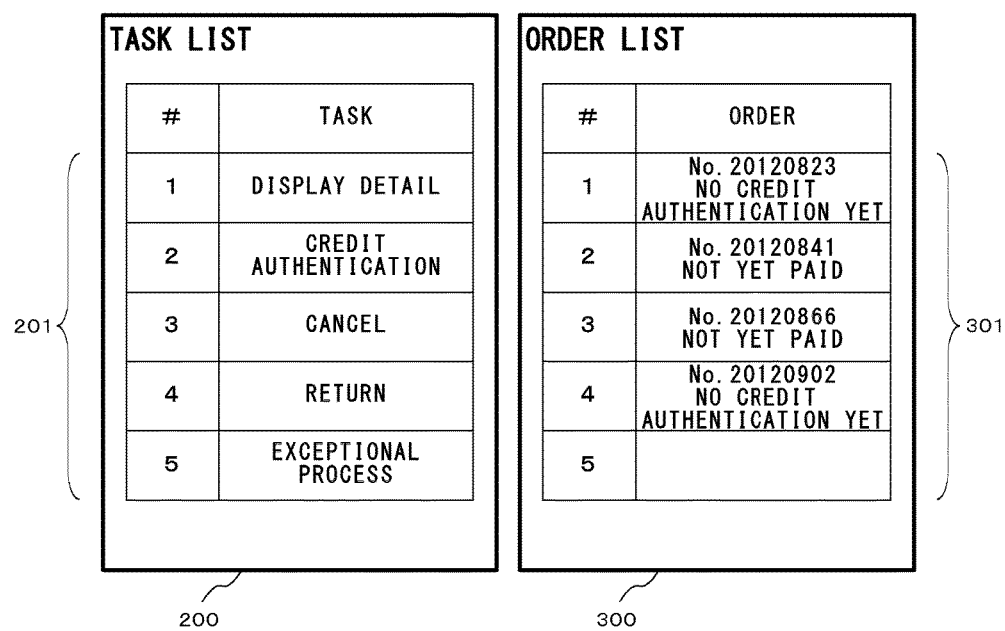
FIG. 7 is a diagram illustrating an example screen displayed on the display of the managing device.

Upon execution of the searching process, when an order processed as an error is found, the managing device 10 changes the state to a list displaying state S1 (A112), and lists up the order processed as an error. For example, as illustrated in FIG. 7, the managing device 10 displays the order processed as an error in a order list display field 301 on an order list display screen 300.

In addition, the managing device 10 displays that the credit authentication process for the order processed as an error and a canceling process thereof are executable in the task display field 201 on the task list display screen 200.

When, in the list displaying state S1, the managing device 10 receives an instruction of returning the state to the standby state Sw from the user with voice, the managing device changes the state to the standby state Sw (A113).

When, in the list displaying state S1, receiving the credit authentication process from the user for one of the displayed orders, the managing device 10 executes the credit authentication process on such an order. Upon completion of the credit authentication process, the managing device 10 changes the state to an authentication result displaying state Se (A114), and displays a result of the credit authentication process.

When in the list displaying state S1, and receiving an instruction for the process of canceling one of the displayed orders from the user, the managing device 10 executes the process of canceling this order (canceling process). Upon completion of the cancel process of this order, the managing device 10 changes the state to a canceling process result displaying state Sc (A116), and displays the result of the canceling process.

When in the authentication result displaying state Se, and receiving an instruction of returning the state to the list displaying state S1 from the user, the managing device 10 changes the state to the list displaying state S1 (A115). Likewise, when in the canceling process result displaying state Sc, and receiving an instruction of returning the state to the list displaying state S1, the managing device 10 changes the state to the list displaying state S1 (A117).

In addition, when the user inputs a request for a certain exceptional process or the inputting made by the user is out of what it is expected, the managing device 10 changes the state to an exceptional state Sexp.

When, for example, the managing device 10 is in the list displaying state S1, and the user gives an instruction to change the state to the exceptional state Sexp, the managing device 10 changes the state to the exceptional state Sexp (A121). The same is true of a case when the managing device 10 is in other states, and when the user gives such an instruction or gives an unexpectable operation, the managing device 10 changes the state from the authentication result displaying state Se to the exceptional state Sexp (A122), or from the canceling process result displaying state Sc to the exceptional state Sexp (A123).

When the state changes to the exceptional state Sexp, the managing device 10 displays that the current state is the exceptional state Sexp, executes a resetting process, and changes the state to the standby state Sw (A131).

The managing device 10 of this embodiment changes the state in accordance with an example state transition diagram that is FIG. 5 as explained above, and executes an executable process in each process in accordance with the selection made by the user.

In addition, as explained above, when starting the process in accordance with the instruction given by the user, the managing device 10 accepts an operation of pre-setting the next process made by the user while executing the process. More specifically, when starting the searching process in the standby state Sw, the managing device 10 displays, as the pre-settable object, and until the completion of the searching process, the process becoming executable in a state prospectively changed by the state changer 15 upon completion of the searching process.

Figure 8:
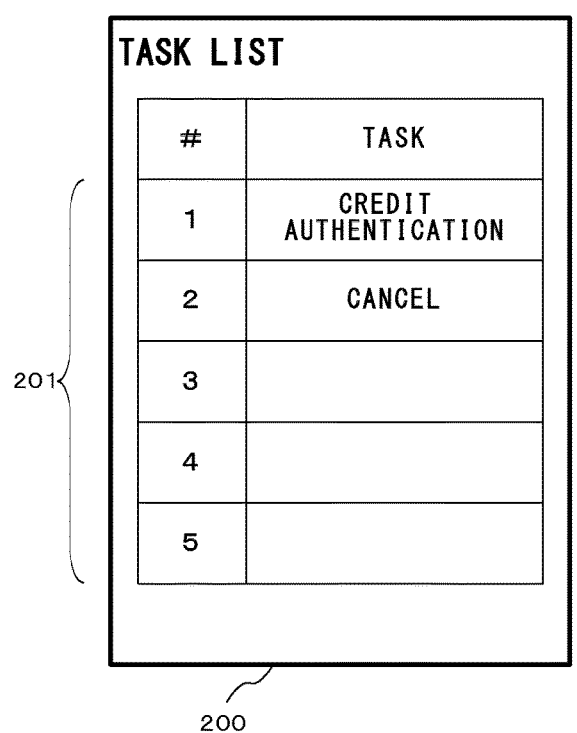
FIG. 8 is a diagram illustrating an example screen displayed on the display of the managing device.

In the case of, for example, the above-explained example, when the searching process completes in the standby state Sw, the managing device 10 prospectively changes the state to the list displaying state S1. In the list displaying state S1, the processes becoming executable by the managing device 10 are the credit authentication process and the canceling process. Hence, when starting the searching process in the standby state Sw, as illustrated in FIG. 8, the managing device 10 displays, as the pre-settable objects, the credit authentication process and the canceling process in the task display field 201.

When the user pre-sets any of the processes displayed in the task display field 201, the managing device 10 displays, after completing the currently executed process and changing the state, processes executable in this state, and selects the pre-set process among those processes. When displaying the processes becoming executable after the state change, if there is a pre-set process, the managing device 10 displays such a process in a highlighted manner. When, for example, the credit authentication process and the canceling process are pre-set, as illustrated in FIG. 9, the managing device 10 displays characters with a larger font size than those of other processes in an area 202 where the credit authentication process is displayed an area 203 where the canceling process is displayed, thereby displaying the pre-set processes (credit authentication process and canceling process) in a highlighted manner.

When completing the searching process and changing the state to the list displaying state S1, if the number of processes pre-set is one, the managing device 10 displays, selects, and starts executing such a process. When multiple processes are pre-set, the managing device 10 can cause the user to select any one process.

Figure 9:
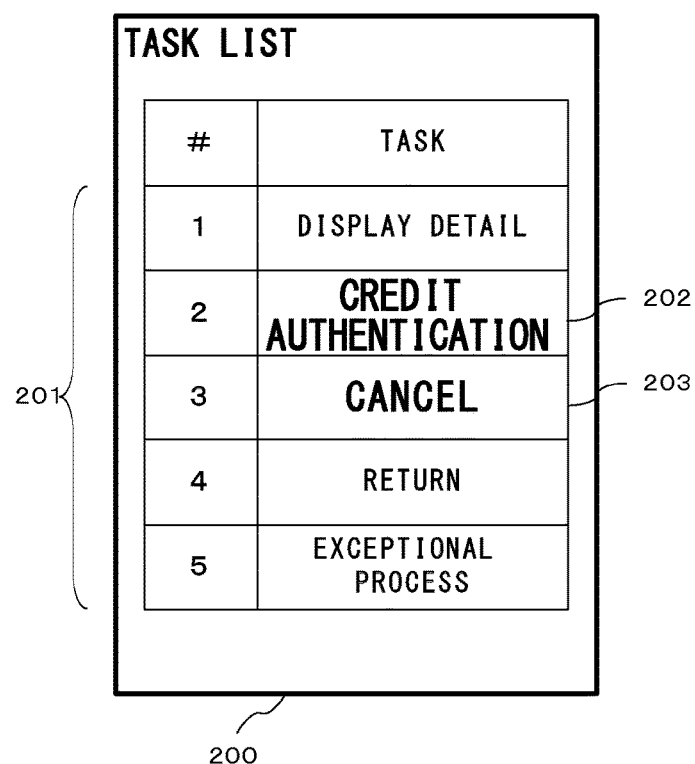
FIG. 9 is a diagram illustrating an example screen displayed on the display of the managing device.

When, for example, the credit authentication process and the canceling process are pre-set, as illustrated in FIG. 9, the managing device 10 displays the credit authentication process and the canceling process in a highlighted manner, and requests the user to select either one of the processes. Next, the managing device 10 selects either one of the processes in accordance with an instruction from the user, and executes the selected process.

In this case, instead of the pre-set process displayed in a highlighted manner, a narrow-down display of the pre-set process among the executable processes may be performed by the managing device 10.

When in the list displaying state S1, the managing device 10 is capable of executing a "process of returning to the standby state Sw" as indicated by A113 in FIG. 5. However, this is a rare case in which the user gives, while causing the managing device 10 to execute the searching process, an instruction to immediately return to the standby state Sw upon completion of the searching process. Hence, according to the example case illustrated in FIG. 8, the managing device 10 does not display, in the task display field 201, the process of returning to the standby process Sw. Likewise, the managing device 10 does not display, as a pre-settable object, an instruction of changing to the exceptional state Sexp (A121 in FIG. 5).

As explained above, the managing device 10 is capable of displaying, as the pre-settable object, only the process in compliance with any arbitrary criteria when displaying the pre-settable object.

In this case, as to the criteria for a pre-settable object displayed while the searching process is being executed, the managing device 10 records only the credit authentication process and the canceling process in the memory device 120 as processes in compliance with the criteria. Next, when starting the above-explained searching process, the managing device 10 reads the criteria for the pre-settable object to be displayed from the memory device 120, and displays, as the pre-settable objects, only the credit authentication process and the canceling process only since the credit authentication process and the canceling process are in compliance with the criteria.

As explained above, the managing device 10 of this embodiment changes the state in accordance with the example state transition diagram illustrated in FIG. 5, and executes an executable process in each state in accordance with the selection made by the user.

According to such a device which changes the state in accordance with the state transition diagram and which executes a process in accordance with each state, it is often difficult to appropriately design the state transition diagram. In general, a user carries out a transaction in practice in accordance with the state transition diagram set by the design engineer for the device, and it is desirable to check whether or not the set state transition diagram is desirable in accordance with a result, or whether or not such a state transition diagram needs an improvement.

The managing device 10 of this embodiment can test a transaction to be carried out by the user in accordance with a process history executed upon actual instruction made by the user (for example, a kind of process, an order of process, and necessary time for process) in accordance with the state transition diagram set in advance, and a state transition diagram newly designed by the design engineer in accordance with the process history. Such a test enables a calculation of a necessary time for the transaction by the user when a newly designed state transition diagram is applied. Alternatively, when, in a transaction by the user and when the newly designed state transition diagram is applied, if a number of changes from a given state to a certain state (for example, the above-explained exceptional state) exceeds a threshold value, the managing device 10 is capable of identifying such a given state. When obtaining information (necessary time and original state changed to the certain state) provided by the managing device 10, it becomes possible for the design engineer to evaluate whether or not the designed state transition diagram is desirable.

In this case, the managing device 10 includes, in addition to the above-explained functions (display 11, inputter 12, selector 13, executor 14, state changer 15, and pre-setter 16), as illustrated in FIG. 10, a memory 21, a calculator 22, and an identifier 23.

The state changer 15 in this case not only has the above-explained function but also changes the state in accordance with a provided state transition diagram and an assigned process. That is, the state changer 15 changes the state in accordance with the state transition diagram newly designed by the design engineer, and the process executed in past in accordance with the request made by the user, thereby transitioning the state without through the process by the executor 14.

The memory 21 stores, in association with each other, the process displayed as a selectable object or a pre-settable object, and a necessary time for the executor 14 to execute such a process. More specifically, when the process is executed in accordance with an actual instruction by the user and in accordance with the state transition diagram set in advance, this process and the necessary time to execute such a process are associated with each other, and stored in, for example, a memory area allocated in the memory device 120. In addition, the memory 21 reads the stored process and necessary time in accordance with a request from the CPU 110.

The CPU 110 can display a time indicating the necessary time for the read process on, for example, the display 11 (A21).

Instead of the memory device 120, the memory 21 may store information indicating the necessary time of each process on the memory devices of other devices connected through the network interface 150.

The calculator 22 calculates, when the state changer 15 changes the state in accordance with a provided state transition diagram and an assigned process, necessary time for the executor 14 to execute a process associated with the state change. That is, when a state transition diagram newly designed by the design engineer, and the process executed in past in accordance with a request from the user are given, the calculator 22 sequentially reads, from the memory 21, a process time when the assigned process is executed in sequence in accordance with the provided state transition diagram (A22), and adds all read process times, thereby calculating a necessary time to execute all assigned processes.

The identifier 23 identifies, when the state changer 15 changes the state in accordance with the provided state transition diagram and the assigned process, and a number of changes from a given state to a certain state exceeds a threshold value, the given state. That is, while the state changer 15 changes the state from a given state to a certain state (for example, exceptional state Sexp) in accordance with the provided state transition diagram and the assigned process, the identifier 23 receives such information from the state changer 15 (A23), and counts the number of changes. When the counted number exceeds the threshold value, the identifier 23 identifies the above-explained given state.

The managing device 10 employing the above-explained configuration becomes able to calculate a necessary time for a transaction by the user when a newly designed state transition diagram is applied. Alternatively, in a transaction by the user when the newly designed state transition diagram is applied, when a number of changes from a given state to a certain state exceeds the threshold value, the managing device 10 can identify the state.

A design engineer 2 of the state transition diagram can obtain a necessary time for the above-explained transaction from the calculator 22 (A24), and evaluate whether or not a newly designed state transition diagram is desirable based on the obtained time. Alternatively, the design engineer 2 of the state transition diagram can obtain information indicating that the number of changes from a given state to a certain state exceeds the threshold value from the identifier 23 (A25). Hence, when there are frequent changes to an undesired state like the above-explained exceptional state Sexp from a given state, the design engineer 2 can check such changes, and obtain useful information to improve the state transition diagram.

The design engineer 2 of the state transition diagram can input the state transition diagram to the managing device 10 through the operating device 130 or the network interface 150. The managing device 10 stores the state transition diagram provided by the design engineer 2 in the memory device 120 in this way.

In addition, when executing the process in accordance with a request from the user, the managing device 10 stores information indicating the kind of process, the order of process, and the necessary time for process, and the like as a process history in the memory device 120. Still further, the managing device 10 can read the recorded process history from the memory device 120.

The state changer 15 reads, from the memory device 120, the process history executed in accordance with the past request from the user, and can change the state like the case in which the processes are executed in the order recorded in the process history with the successive processes recorded in the process history being as the assigned processes.

Still further, the managing device 10 may read the necessary time of the process from the memory 21 when displaying, for example, an executable process, and may display the read time on the display 11.

The managing device according to the embodiment of the present disclosure can be realized by a normal computer system rather than an exclusive system. For example, a computer-readable non-transitory memory medium, such as a flexible disk, a CD-ROM (Compact Disk-Read Only Memory), a DVD (Digital Versatile Disk), or an MO (Magnet Optical Disk), having stored therein a program allowing a computer to carry out the aforementioned operations may be distributed, and such a program may be installed in a computer system to configure a managing device that carries out the aforementioned processes. In addition, such a program may be stored in a disk device or the like of a server device over the Internet, and may be downloaded to a computer in a manner superimposed on, for example, carrier waves.

Still further, the configuration of the managing device according to the embodiment of the present disclosure is not limited to a solo computer. For example, a system including multiple computers that share the above-explained respective operations may provide the respective functions.

Embodiments of the present disclosure were explained above, but the present disclosure is not limited to any particular embodiment, and permits various changes and modifications within the scope and spirit of the subject matter as recited in the appended claims.

In addition, the above-explained embodiments are merely to explain the present disclosure, and are not intended to limit the present disclosure. That is, the scope and spirit of the present disclosure are indicated by the appended claims rather than the embodiments. Furthermore, various modifications carried out within the range of the appended claims and the equivalent range thereto are also within the scope and spirit of the present disclosure.

REFERENCE SIGNS LIST

1 User
2 Design engineer
10 Managing device
11 Display
12 Inputter
13 Selector
14 Executor
15 State changer
16 Pre-setter
21 Memory
22 Calculator
23 Identifier
100 Information device
110 CPU
111 ROM
112 RAM
120 Memory device
130 Operating device
140 Device interface
141 Display device
142 Sound collecting device
150 Network interface
160 Internal bus
161 Device connection
200 Task list display screen
201 Task display field
202 Area indicating credit authentication process
203 Area indicating canceling process
300 Order list display screen
301 Order list display field
800 Eye-glass display device
801 Lens of eye-glass display device

The invention claimed is:

1. A control device comprising:
a display configured to display a plurality of voice selectable objects each corresponding to at least one executable process;
an inputter configured to voice input;
at least one memory configured to store program code; and
at least one processor configured to access the at least one memory, read and operate according to the program code, the program code including:
 input accepting code configured to cause at least one of said at least one processor to receive a first voice input accepted by the inputter;
 selector code configured to cause at least one of said at least one processor to select one of the displayed plurality of voice selectable objects, based on an evaluation of the received first voice input, wherein the selected object corresponds to a first process executable under a current state;
 execution code configured to cause at least one of said at least one processor to execute the selected first executable process;
 state changer code configured to cause at least one of said at least one processor to transition, in response to the selected first executable process completing execution, from the current state to a new state based on the current state and a result of the selected first executable process,
 wherein upon the first selected executable process starting execution and prior to the first executable process completing execution, a pre-settable voice selectable object corresponding to a second executable process under the new state is displayed and is set based on a second voice input accepted by the inputter; and
 the executor code is further configured to cause at least one of said at least one processor to upon the first executable process completing execution, execute the second executable process under the new state corresponding to the pre-settable object.

2. The control device according to claim 1, further pre-setter code configured to compare the process displayed as the pre-settable object with an inputting accepted while the pre-settable object is being displayed, and pre-set any one of the processes displayed as the pre-settable objects; and the selector code is further configured to cause at least one of said at least one processor to select the pre-set process when the displayed processes contain the pre-set process.

3. The control device according to claim 2, wherein when the displayed processes contain the pre-set process, the display is further configured to display the pre-set process in a highlighted manner.

4. The control device according to claim 2, wherein when the processes to be displayed contain a plurality of pre-set processes, the display is further configured to display and narrow down the processes to be displayed to the pre-set processes.

5. The control device according to claim 1, further comprising a memory that is configured to store, in association with each other, a process displayed as the selectable object or the pre-settable object, and a necessary time for the executor to execute that process, wherein the display displays the necessary time to execute the process displayed as the selectable object while the selectable object is being displayed.

6. The control device according to claim 1, the state changer code is further configured to cause at least one of said at least one processor to:
determine, based on the current state, one or more states that can be transitioned to from the current state;
display, until completion of the first executable process, one or more pre-settable objects corresponding to the one or more processes executable under the one or more determined states;
select from the displayed one or more pre-settable objects based on the received first voice input;
find one or more new processes executable under the new state corresponding to the selected pre-settable objects;
if one new process is found, execute the one new process and
if more than one new process is found, request the user to select one of the new processes, and execute the user selected new process.

7. The control device according to claim 1, wherein:

the state changer code is further configured to change the state in accordance with a provided state transition diagram and an assigned process; and the control device further comprises a calculator configured to calculate a necessary time for the executor to execute a process associated with a state change when the state changer changes the state in accordance with the provided state transition diagram and the assigned process.

8. The control device according to claim 1, wherein:

the state changer code is further configured to change the state in accordance with a provided state transition diagram and an assigned process; and the managing device further comprises an identifier that is configured to identify, when the state changer changes the state in accordance with the provided state transition diagram and the assigned process and a number of changes from a given state to a predetermined state exceeds a threshold value, the given state.

9. A management method comprising:

displaying a plurality of voice selectable objects each corresponding to at least one executable process;

receiving a first voice input;

selecting one of the displayed voice selectable objects based on an evaluation of the received first voice input, wherein the selected object corresponds to a first process executable under a current state;

executing the first executable process;

in response to the first executable process completing execution, transitioning from the current state to a new state based on evaluating the current state and a result of the execution of the first executable process, in response to the first executable process starting execution and prior to the first executable process completing execution:

displaying a pre-settable voice selectable object corresponding to at least a second process executable under the new state;

receiving a second voice input and setting the pre-settable object based on the second voice input; and in response to the first executable process completing execution, executing the second executable process under the new state corresponding to the pre-settable object.

10. The management method according to claim 9, further comprising comparing the process displayed as the pre-settable object with an inputting accepted while the pre-settable object is being displayed, and which pre-sets any one of the processes displayed as the pre-settable objects, wherein the pre-set process is selected when the displayed processes contain the pre-set process.

11. The management method according to claim 10, wherein when the displayed processes contain the pre-set process, in the display step the pre-set process is displayed in a highlighted manner.

12. The management method according to claim 10, wherein when the processes to be displayed contain a plurality of pre-set processes, in the display step, the processes to be displayed to the pre-set processes is displayed and narrowed down.

13. The management method according to claim 9, further comprising storing, in association with each other, a process displayed as the selectable object or the pre-settable object, and a necessary time for the executing step to execute that process, wherein the necessary time to execute the process is displayed as the selectable object while the selectable object is being displayed is displayed.

14. The management method according to claim 9, wherein when the selected process starts, in the display step, as the pre-settable object, a process among the processes becoming executable under a state prospectively changed in the changing step upon completion of the selected process and in compliance with a predetermined criterion is displayed.

15. The management method according to claim 9, wherein:

in the changing step the state is changed in accordance with a provided state transition diagram and an assigned process; and the management method further comprises a calculating step of calculating a necessary time for the executing step to execute a process associated with a state change when the state is changed in the changing step in accordance with the provided state transition diagram and the assigned process.

16. The management method according to claim 9, wherein:
the state is changed in accordance with a provided state transition diagram and an assigned process; and
the management method further comprises identifying, when the state is changed in accordance with the provided state transition diagram and the assigned process and a number of changes from a given state to a predetermined state exceeds a threshold value, the given state.

17. A computer-readable non-transitory recording medium having stored therein a program that causes a computer to:
display a plurality of voice selectable objects each corresponding to at least one executable process;
accept a voice input;
select one of the displayed voice selectable objects based on an evaluation of the received first voice input, wherein the selected object corresponds to a first process executable under a current state;
execute the first executable process;
in response to the first executable process completing execution, transition from the current state to a new state based on evaluating the current state and a result of the execution of the first executable process,
in response to the first executable process starting execution and prior to the first executable process completing execution:
display a pre-settable voice selectable object corresponding to at least a second process executable under the new state;
receive a second voice input and setting the pre-settable object based on the second voice input; and
in response to the first executable process completing execution, execute the second executable process under the new state corresponding to the pre-settable object.

18. The computer-readable non-transitory recording medium according to claim 17, wherein the program further causes the computer to compare the process displayed as the pre-settable object with an inputting accepted while the pre-settable object is being displayed, and which pre-sets any one of the processes displayed as the pre-settable objects,
wherein the pre-set process is selected when the displayed processes contain the pre-set process.

19. The computer-readable non-transitory recording medium according to claim 18, wherein the program further causes the computer to when the displayed processes contain the pre-set process, display the pre-set process in a highlighted manner.

20. The computer-readable non-transitory recording medium according to claim 18, wherein the program further causes the computer to when the processes to be displayed contain a plurality of pre-set processes, display and narrow down the processes to be displayed to the pre-set processes.

21. The computer-readable non-transitory recording medium according to claim 17, wherein the program further causes the computer to in association with each other, display the selectable object or the pre-settable object, and a necessary time for the executing function to execute that process,
wherein the displaying displays the necessary time to execute the process displayed as the selectable object while the selectable object is being displayed.

22. The computer-readable non-transitory recording medium according to claim 17, wherein the program further causes the computer to when the selected process starts, display, as the pre-settable object, a process among the processes becoming executable under a state prospectively changed by the state-changing function upon completion of the selected process and in compliance with a predetermined criterion.

23. The computer-readable non-transitory recording medium according to claim 17, wherein the program further causes the computer to:
change the state in accordance with a provided state transition diagram and an assigned process; and
calculate a necessary time to execute a process associated with a state change when the state changes in accordance with the provided state transition diagram and the assigned process.

24. The computer-readable non-transitory recording medium according to claim 17, wherein the program further causes the computer to:
the state-changing function changes the state in accordance with a provided state transition diagram and an assigned process; and
the program further realizes an identifying function that identifies, when the state-changing function changes the state in accordance with the provided state transition diagram and the assigned process and a number of changes from a given state to a predetermined state exceeds a threshold value, the given state.

\* \* \* \* \*